US012663524B2

(12) United States Patent
Lu et al.

(10) Patent No.:     US 12,663,524 B2
(45) Date of Patent:          Jun. 23, 2026

(54) DETECTING PHANTOM OBJECTS IN RANGING SENSOR DATA

(71) Applicant: GM Cruise Holdings LLC, San Francisco, CA (US)

(72) Inventors: Siyuan Lu, San Mateo, CA (US); Sijia Chen, Sunnyvale, CA (US); Keren Ye, Foster City, CA (US); Xianming Liu, San Carlos, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 1009 days.

(21) Appl. No.: 17/843,989

(22) Filed: Jun. 18, 2022

(65)           Prior Publication Data

US 2023/0408656 A1     Dec. 21, 2023

(51) Int. Cl.
| | |
|---|---|
| *G01S 7/497* | (2006.01) |
| *G01S 7/41* | (2006.01) |
| *G01S 7/48* | (2006.01) |
| *G01S 17/89* | (2020.01) |
| *G01S 17/931* | (2020.01) |

(52) U.S. Cl.
CPC ............ *G01S 7/497* (2013.01); *G01S 7/4802* (2013.01); *G01S 17/89* (2013.01); *G01S 17/931* (2020.01); *G01S 7/41* (2013.01)

(58) Field of Classification Search
CPC ........ G01S 7/497; G01S 17/89; G01S 17/931; G01S 7/41; G01S 17/42; G01S 17/894; G01S 7/4802; G01S 13/46; G01S 2013/464
See application file for complete search history.

(56)           References Cited

U.S. PATENT DOCUMENTS

| | | | |
|---|---|---|---|
| 6,323,802 B1 * | 11/2001 | Tokoro .................. | G01S 13/931 342/70 |
| 2023/0050013 A1 * | 2/2023 | Sung ........................ | G01S 17/89 |
| 2023/0366994 A1 * | 11/2023 | Peter ..................... | G01S 7/4876 |

FOREIGN PATENT DOCUMENTS

WO      WO 2023245087 A1     12/2023

* cited by examiner

*Primary Examiner* — Isam A Alsomiri
*Assistant Examiner* — Joseph C Fritchman
(74) *Attorney, Agent, or Firm* — CANTOR COLBURN LLP

(57)           ABSTRACT

Object detection for ranging sensor data may detect objects which are not actually present in the environment. To identify certain of these phantom objects, objects detected in the environment are analyzed to determine whether they are enclosed by another object and if the enclosed object has a distance from the ranging sensor higher than the enclosing object. This may suggest that the enclosing object has a surface or other feature that is sensed as additional depth that manifests as a separate detectable object. These phantom objects are identified and removed from further perception processing.

15 Claims, 9 Drawing Sheets

DETECTING PHANTOM OBJECTS IN RANGING SENSOR DATA

BACKGROUND

This disclosure relates generally to environment perception and more particularly to detecting erroneously-identified objects in object recognition of ranging sensor data.

Ranging sensors, particularly those that have active scanning (e.g., LIDAR), provide detection of an environment by sensing distance of features in the environment that may be used to detect and segment objects and aid in generating a model of the environment around the sensor. However, because of the nature of the active scanning, aspects of the environment may cause the scanning to incorrectly identify objects. In particular, the reflectivity or transmissibility of some surfaces may affect the scan such that the apparent distance of objects with respect to that surface appears different than the actual distance. This may result in the identification of objects by object recognition and perception models that are not actually there in the environment. These erroneously detected (e.g., that do not exist in the detected location) objects are termed phantom objects. For systems which use these sensors for environment perception and use that perceived environment to plan and execute motion in the environment, the phantom objects may also affect the effective motion planning when such phantom objects are considered to exist in the perceived world in which the motion planning is performed.

DETAILED DESCRIPTION

Overview

Figure 1:
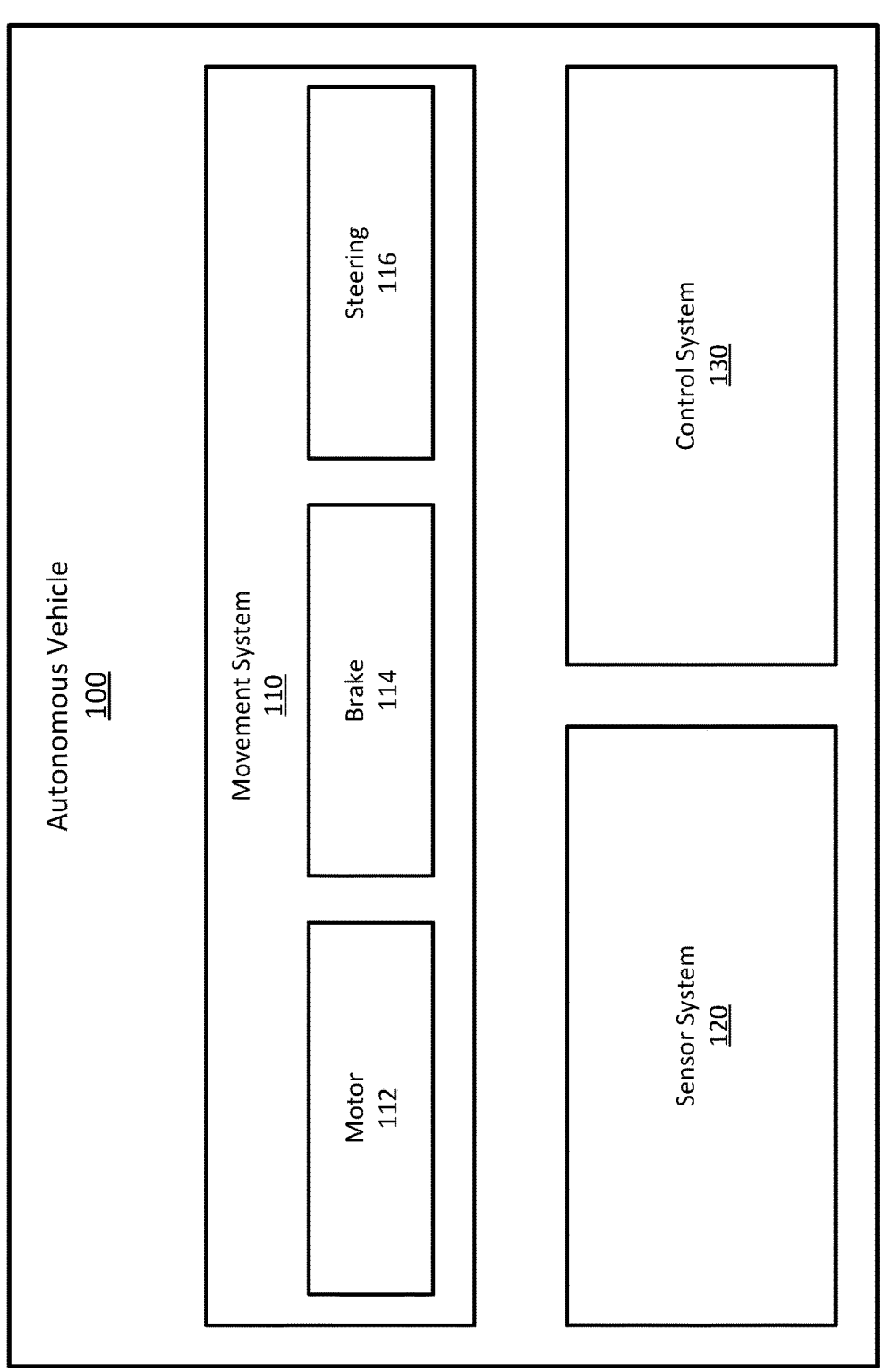
FIG. 1 shows example components of an autonomous vehicle, according to one embodiment.

This disclosure provides an approach for identifying and removing phantom objects detected in ranging sensor data. To detect phantom objects, the sensor data captured by a ranging sensor is processed by an object detection algorithm to detect a set of candidate objects and the respective positions of objects in the sensor data. The set of candidate objects may then be filtered for phantom objects to remove the phantom objects before perception processing. Each object may have an associated type (e.g., a classification)

and positions (e.g., coordinates) in the sensor data. In general, phantom objects may be caused by mirrors and other surfaces that are typically framed or otherwise "within" another object. To detect phantom objects, the candidate objects are evaluated to determine whether any objects are enclosed (or partially enclosed) within another object. For such enclosed objects, the distance of the objects is evaluated to determine whether the enclosed object appears to be further from the sensor than the enclosing object. When the enclosed object has a distance further than the object enclosing it, the enclosed object may be considered a likely artifact (e.g., a phantom object) in the sensor data caused by a surface of the enclosing object and may be removed from the candidate objects. Likewise, enclosed objects that are not further than the enclosing object (e.g., closer to the sensor) than the enclosing object may be maintained in the set of candidate objects. After filtering for phantom objects, the candidate objects may then be used for further perception, such as generating or updating a local environment model.

The phantom objects may also be identified and removed with additional considerations. In one example, the objects are also evaluated according to the type of the enclosed or enclosing object or a combination of the object types. For example, an enclosed object is removed in some embodiments when the enclosing object (or the enclosed object) has a particular type, such as a heavy vehicle or a car. In addition, the determination of phantom object may also be based on the movement of candidate objects over time. For example, the relative movement of the enclosed and enclosing objects with respect to one another may indicate that the enclosed object is an artifact of the enclosing object to confirm the enclosed object may be removed. As another example, the movement of the enclosed object may be compared to the movement of another detected object.

As such, this approach provides a way to correct errors in object detection that occur in ranging sensors. While the embodiments generally discussed below are discussed in the context of an autonomous vehicle (in which the removal of phantom objects may also reduce errors in subsequent path planning), embodiments of the invention may be applied more generally to processing detected objects in sensor data in other configurations.

Additional details and variations of these aspects are further discussed in detail below.

As will be appreciated by one skilled in the art, aspects of the present disclosure, may be embodied in various manners (e.g., as a method, a system, a computer program product, or a computer-readable storage medium). Accordingly, aspects of the present disclosure may be implemented in hardware, software, or a combination of the two. Thus, processes may be performed with instructions executed on a processor, or various forms of firmware, software, specialized circuitry, and so forth. Such processing functions having these various implementations may generally be referred to herein as a "module." Functions described in this disclosure may be implemented as an algorithm executed by one or more hardware processing units, e.g., one or more microprocessors of one or more computers. In various embodiments, different steps and portions of the steps of each of the methods described herein may be performed by different processing units and in a different order, unless such an order is otherwise indicated, inherent, or required by the process. Furthermore, aspects of the present disclosure may take the form of one or more computer-readable medium(s), e.g., non-transitory data storage devices or media, having computer-readable program code configured for use by one or more processors or processing elements to perform related processes. Such a computer-readable medium(s) may be included in a computer program product. In various embodiments, such a computer program may, for example, be sent to and received by devices and systems for storage or execution.

This disclosure presents various specific examples. However, various additional configurations will be apparent from the broader principles discussed herein. Accordingly, support for any claims which issue on this application is provided by particular examples, as well as such general principles, as will be understood by one having ordinary skill in the art.

In the following description, reference is made to the drawings where like reference numerals can indicate identical or functionally similar elements. Elements illustrated in the drawings are not necessarily drawn to scale. Moreover, certain embodiments can include more elements than illustrated in a drawing or a subset of the elements illustrated in a drawing. Further, some embodiments can incorporate any suitable combination of features from two or more drawings.

As described herein, one aspect of the present technology may be the gathering and use of data available from various sources to improve quality and experience. The present disclosure contemplates that in some instances, this gathered data may include personal information. The present disclosure contemplates that the entities involved with such personal information respect and value privacy policies and practices.

The following disclosure describes various illustrative embodiments and examples for implementing the features and functionality of the present disclosure. While particular components, arrangements, or features are described below in connection with various examples, these are merely examples used to simplify the present disclosure and are not intended to be limiting.

Reference may be made to the spatial relationships between various components and to the spatial orientation of various aspects of components as depicted in the attached drawings. However, the devices, components, members, apparatuses, etc. described herein may be positioned in any desired orientation. Thus, the use of terms such as "above," "below," "upper," "lower," "top," "bottom," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, or conditions, the phrase "between X and Y" represents a range that includes X and Y.

In addition, the terms "comprise," "comprising," "include," "including," "have," "having," or any other variation thereof, are intended to cover a non-exclusive inclusion. For example, a method, process, device, or system that comprises a list of elements is not necessarily limited to only those elements but may include other elements not expressly listed or inherent to such method, process, device, or system. Also, the term "or" generally refers to an inclusive use of "or" (including combinations of listed elements) rather than an exclusive use of "or" (exclusive selection of one element) unless expressly indicated or otherwise inherent to the use of "or."

System Overview

FIG. 1 shows example components of an autonomous vehicle 100, according to one embodiment. In general, an autonomous vehicle 100 includes a movement system 110 to affect physical movement of the autonomous vehicle 100 within an environment surrounding the vehicle, a sensor system 120 that includes a set of sensors for capturing information about the movement of the autonomous vehicle 100 and receiving information about the environment, and a control system 130 that perceives the environment and provides control to the movement system 110 for moving the autonomous vehicle 100 within the environment. In various embodiments, the autonomous vehicle 100 may be completely autonomous and the movement system 110 may be controlled without manual user operation, and in other embodiments may be partially autonomous, such that certain functions or features are automatically provided by the control system 130. In other instances, a user may manually control operation of the movement system 110, for example through various types of manual control mechanisms or inputs, such as pedals, steering wheel, gearbox control, etc. Such manual operation may be provided by an occupant of the autonomous vehicle 100 or may be provided remotely via a communication link to an external operator. In some embodiments, the autonomous vehicle 100 may transition operation to modes with more or less autonomous control based on various conditions, such as a user request, vehicle conditions, or environmental conditions. The autonomous vehicle 100 may also operate with or without an occupant in various embodiments or may activate or deactivate autonomous functions based on occupancy. In some embodiments the autonomous vehicle 100 may include no passenger cabin.

The movement system 110 includes various components for affecting movement of the autonomous vehicle 100 in the environment. As such, the movement system 110 may include a motor 112 that may be connected to a drive system (e.g., wheels) that moves the autonomous vehicle 100. The motor 112 may have multiple operation modes for moving forward, backward, or set to neutral, and may also be set to different speeds/torques (e.g., via various gear ratios). The motor 112 may also be capable of different levels of power output as controlled by a throttle. The movement system 110 may also include a brake 114 for slowing or stopping the movement of the autonomous vehicle 100 along with a steering mechanism 116 for changing the direction of travel of the autonomous vehicle 100. In general, the particular implementation of the components of the movement system 110 enable the autonomous vehicle to start, stop, and change direction in its environment, and may vary according to the particular type of the autonomous vehicle 100. Generally, the movement system 110 thus represents the mechanical components for movement and are controlled by signals received from the control system 130 that designate, for example, an amount of output by the motor, a steering direction for the steering mechanism 116, and so forth.

The sensor system 120 includes a set of sensors for monitoring the autonomous vehicle 100 and the environment around the autonomous vehicle 100. The particular set of sensors and the arrangement thereof may vary according to different examples. As examples, the sensors may include various sensors for monitoring the mechanical performance of the autonomous vehicle 100, such as sensors for monitoring motor performance, fluid levels, air pressure, wheel rotation speed, etc.

The sensors may also include various sensors for localization of the autonomous vehicle 100 within the environment and for perceiving the environment of the autonomous vehicle 100. In general, these sensors may capture various types of modalities of information, such as audio, video, and various electromagnetic frequencies. The sensors may include passive (e.g., receipt-only) and active sensing technologies (e.g., environmental scanning with active transmission and receipt of a return signal). Although certain sensors are discussed here, in practice, more or fewer sensors may be included according to the particular configuration of the various embodiments. The sensors may include one or more imaging sensors, which may include visible-light imaging sensors (e.g., a camera) or an infrared (IR) imaging sensor, radio detection and ranging (RADAR) sensors, or light detection and ranging (LIDAR) sensors. The sensors may also include a receiver for global positioning satellite (GPS) location data, a compass, and receivers for wireless signals, such as cellular or other wireless networks. The sensors may also include receivers for various electromagnetic (EM) signals in various frequencies along with microphones for receipt of audio and other sound information from the environment.

Each sensor may also capture information in respective data formats and modalities according to the capacities of the sensors. For example, an imaging sensor typically captures received light as a two-dimensional image having one or more channels. As such, a visible light camera typically describes color images with color channels in an image space (e.g., as values of red-green-blue, hue-saturation-lightness, hue-saturation-value, cyan-yellow-magenta-key, etc.), while an infrared camera may describe received infrared frequencies in one channel. Similarly, audio capture with a microphone may be described as a frequency waveform, while RADAR/LIDAR data may be represented as a point cloud of data points representing the environment as points at varying distances from the sensor.

The position and placement of the sensors may also vary according to different embodiments and may be calibrated with respect to characteristics of each individual sensor and also with respect to one another to determine the relative position and orientation of each sensor to translate information captured from each sensor to a joint coordinate system. This may permit data from multiple sensors to be aligned to a common coordinate system such that information from multiple sensors may be jointly interpreted.

The sensors may also include various sensors for perceiving the internal condition of the autonomous vehicle 100, such as a microphone to receive any noises or audible instructions from a passenger within the vehicle or a camera for viewing the passenger cabin.

The control system 130 receives sensor data from the sensor system 120 and generates signals for the control of the components of the movement system 110 to navigate the autonomous vehicle 100 within its environment. The control system 130 thus may include components for perceiving the environment based on the sensor data, planning movement, and executing movement with control signals. The control system 130 is further discussed in FIG. 2.

Although generally the autonomous vehicle 100 refers to a vehicle typically operated on a road, such as a car, light truck, heavy truck, principles of this disclosure may also apply to other types of autonomously- or partially-autonomously-operated vehicles. Such additional types of autonomous vehicles 100 may include aerial vehicles such as drones, helicopters, or planes, as well as aquatic vehicles including surface and sub-surface vehicles. As such, the principles discussed herein may generally apply to systems that sense environmental information, analyze and perceive aspects of the environment, and/or provide for automated control of the autonomous vehicle 100.

Not shown in FIG. 1 are various additional components that may be included in various embodiments and are omitted for the purpose of simplifying the discussion herein. For example, the autonomous vehicle 100 may include lights (e.g., headlights, brake lights, etc.), signaling mechanisms, access control (e.g., door locks), battery, fuel storage, and other suitable components.

Figure 2:
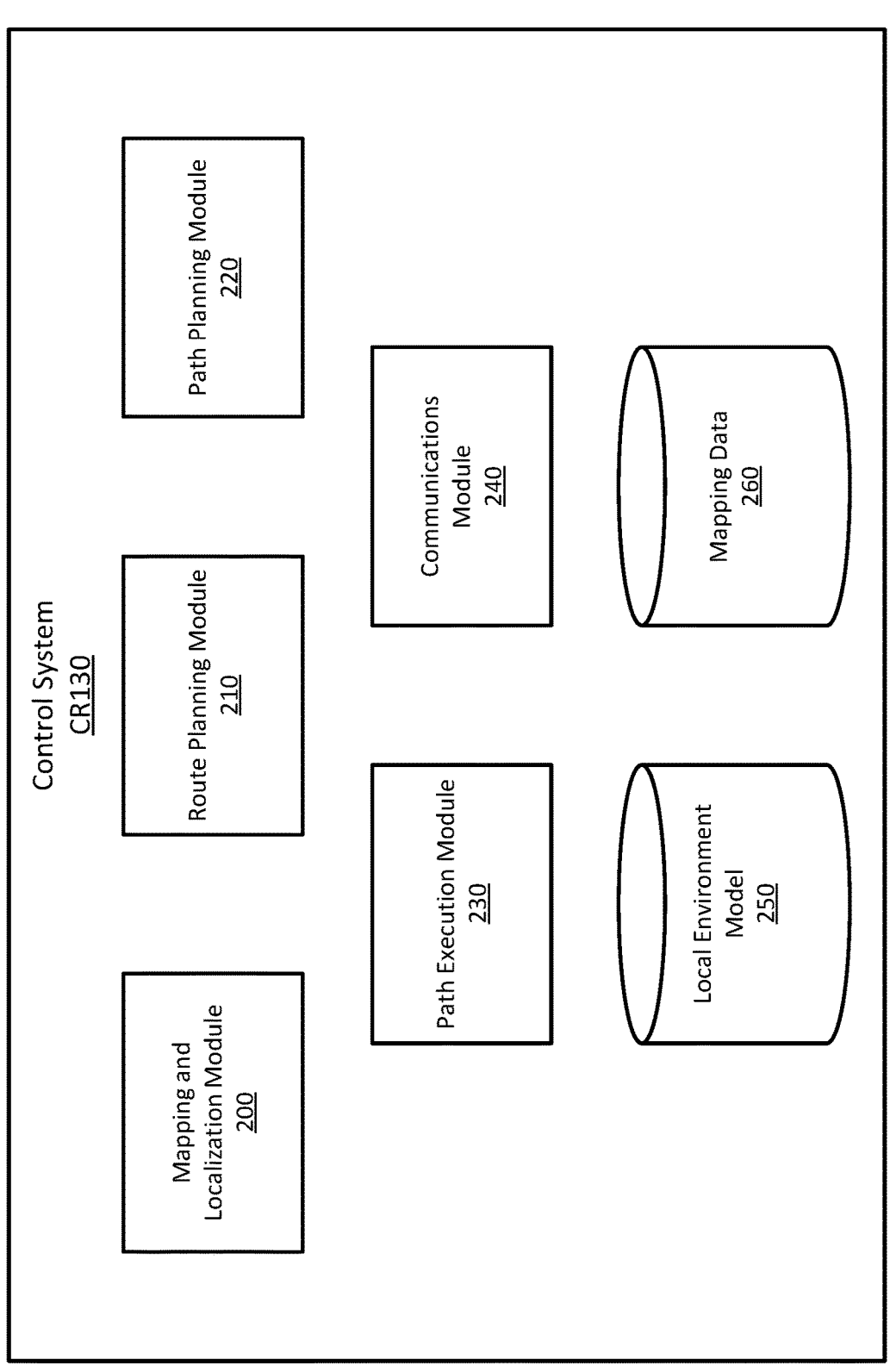
FIG. 2 shows components of a control system, according to one embodiment.

FIG. 2 shows components of the control system 130, according to one embodiment. The control system 130 includes various components for processing sensor data to perceive the environment of the autonomous vehicle 100 and provide control signals to the movement system 110. The control system 130 may include various computing modules and data storage elements. To perceive and understand the environment, a mapping and localization module 200 may generate and maintain a local environment model 250 that describes conditions of the current environment around the autonomous vehicle 100, such as various objects perceived in the environment based on received sensor data and in conjunction with a set of mapping data 260. Additional modules, such as a route planning module 210, a path planning module 220, and a path execution module 230, determine and execute long- and short-term movement planning. Finally, a communications module 240 may communicate with external systems, both to coordinate movement of the autonomous vehicle 100 and to update software and data components.

In further detail, the mapping and localization module 200 determines and maintains the local environmental model 250 and may implement an environment perception stack for identifying objects and characteristics of the environment. The local environment model 250 may thus describe individual objects in the environment, e.g., objects, people, trees, signs, etc., in a virtual model of the environment consistent with the sensor data. The position of the objects relative to one another along with a current velocity (e.g., with respect to other objects, non-moving/background objects, or the autonomous vehicle 100) may be characterized in the local environmental model 250. The mapping and localization module 200 may also predict future movement of the perceived objects at various timeframes based, e.g., on the current velocity, as well as other sensed data that may predict future change in heading or intention by the object. As such, while the current velocity of a detected object may be expected to continue for at least a short timeframe (e.g., 50 ms), over longer timeframes the objects may be predicted to continue at that heading and speed, slow down, speed up, change direction, and so forth. For example, when a "stop" sign is in the environment ahead of a vehicle, the vehicle may be expected to change its speed to reduce speed and likely stop in the vicinity of the stop sign. The expected movement of objects at different timeframes may thus be predicted with different levels of confidence and may be probabilistically represented according to different types of actions that may be inferred for moving objects. For example, a pedestrian on a street corner may continue to stand at the corner or may, at some future time, enter the street to cross.

To build and update the local environment model 250, the mapping and localization module 200 may process the received data from the various sensors and apply object recognition, motion prediction, and localization algorithms. That is, the mapping and localization module 200 determines objects in the environment, predicts how those objects may move, and determines the location of the autonomous vehicle 100 in relation to the environment. The state of the local environment may thus be stored as the local environment model 250.

To describe the local environment, the sensed information may be processed by various algorithms for perception and object detection. The various sensor data may be individually processed as well as processed in combination with other sensor data of the same or different types. For example, in some embodiments, multiple image sensors may overlap in the portions of the environment viewable by the respective sensors. The captured images may be stitched together to form a larger image for the combined regions, and the respective difference in apparent size and position of an object from the cameras may also be used to infer distance to the object from the images. In some embodiments, imaging sensors may be disposed around the autonomous vehicle, such that the captured images may be merged to form a panoramic view of the environment. In addition, the captured image data and other sensor data (e.g., RADAR and LIDAR point cloud data) may be processed by one or more neural networks for object segmentation and identification. These networks may perform processing on sensor data individually (e.g., initial object identification based on image or LIDAR data alone) and may include networks (or network layers) for joint processing of multiple sensor types together.

Data from ranging sensors (e.g., sensors which capture distance information by processing return of an active emission such as LIDAR and RADAR), may be filtered to identify and remove phantom objects. As further discussed in FIGS. 3-6, the phantom objects may appear due to surfaces that affect return of the emission and create a longer time-of-flight and thus may seem to be at a different distance rather than as a surface at the same object. The identification and processing of these phantom objects by the mapping and localization module 200 is further discussed in the FIGS. below.

The current local environment model 250 may also be sequentially generated and updated at a frequency based on the sensor information since the last update. As such, each local environment model 250 may represent a "frame" of the perceived environment. In addition, the current local environment model 250 may also account for prior captured sensor data (e.g., of a prior frame) and prior frames of the local environmental model in constructing a current local environment model 250. This may permit, for example, object and motion tracking over time to improve object classification as well as movement prediction and to account for objects which may be temporarily obscured by other objects. In some embodiments, the construction and maintenance of the local environment model 250 may be performed based on the captured sensor data by the sensor system 120.

The environment mapping may also be performed in conjunction with information from the mapping data 260. The mapping data 260 stores longer-term data about various regions that may be used for localization and route planning. For example, the mapping data 260 may include roads, landmarks, coordinates, road signs and other road control information, and various other information associated with a mapping of the world that is generally expected to be relatively stable over time. Detected objects and other sensor data may be used to determine the position of the autonomous vehicle with respect to the known information in the mapping data 260. For example, the GPS location information may be used to determine the likely position of the vehicle with respect to the mapping data 260. However, as GPS location information may be distorted or imprecise, particularly when navigating environments with many buildings or other interference, additional information may be used to synchronize the perceived environment with the mapping data 260. For example, locally-perceived objects and other signatures of the environment may be matched with known landmarks and characteristics in the mapping data 260. After determining the location of the autonomous vehicle with respect to the mapping data 260, the local environment model 250 may also be supplemented with information from the mapping data 260, for example, to provide information about areas of the environment beyond the perception range of the sensors of the sensor system 120. This information may be useful, for example, for longer-term motion planning or movement prediction of other objects. For example, the sensors may perceive objects that obscure road signs from the sensor system 120 that may be known or expected in the environment based on the mapping data 260.

The local environment model 250 may also be used to update the mapping data 260 when the locally-sensed data differs from the mapping data 260. For example, the sensor data may not perceive a road sign at a location designated in the mapping data 260 despite a view of that location, or a road may be closed or under construction or otherwise in a different condition than designated in the mapping data 260. The mapping and localization module 200 may communicate differences between the mapping data 260 and the locally-perceived environment to an external system that maintains the mapping data 260.

The route planning module 210 determines longer-range planning and routing for the autonomous vehicle 100 and may determine, for example, an expected navigation route from an origin to a destination. Conceptually, the route planning module 210 may determine the high-level navigation objective and route, in contrast to the path planning module 220, which may determine short-term navigation with respect to the local environment model 250. While discussed here as separate components, in practice, these components may be jointly implemented, and the longer-term route planning may be affected by information discovered from the local path execution or environmental perception. For example, a planned route may indicate travel along a road that the local environment model 250 indicates is not available or for which there is no executable path to reach, such that another destination or route must be determined.

The route planning module 210 may determine the current location of the autonomous vehicle 100 and a destination and the overall route (e.g., individual roads and turns) to arrive at the destination from the current location. The route may be determined by available ways to reach the destination from the origin and evaluated with respect to traversal costs such as expected travel speeds, fuel usage, time, ride smoothness/passenger comfort, traffic, and so forth. The available ways of reaching the destination may be explored by various traversal algorithms based on the costs of traversing different routes and cost preferences for combining different types of costs.

The route planning module 210 may also receive instructions from an external system specifying a route or a destination. For example, the external system may coordinate destinations for many autonomous vehicles, such as destinations for passenger or cargo pickup/delivery, for vehicle maintenance or refueling, and so forth. The destination and/or a route for reaching the destination may thus be determined by the route planning module 210 or provided by the external system.

The path planning module 220 determines a path for navigating the local environment based on the local environment model 250 and the desired route specified by the route planning module 210. As such, the route from the route planning module 210 may provide a route indicating that the autonomous vehicle should turn right at the next street in approximately two miles. The path planning module 220 evaluates objects in the local environment (e.g., other cars, pedestrians, etc.) and determines the desired path for the autonomous vehicle 100 to navigate to and execute the turn. This may include, for example, changing lanes to a turn lane based on available space in the turn lane, stopping at the intersection, executing the turn, and so forth.

The path planning module 220 may look ahead an amount of time in predicting the movement of objects during its planning and update the planned path for each frame that the local environment model 250 is updated. The path planning module 220 may thus provide desired speed, turning, and other information to the path execution module 230 for execution.

The path execution module 230 executes the path with the various movement control signals for the movement system 110 to execute. Such signals may control application of the throttle, brake, and steering to execute the planned path. The path execution module 230 may include feedback mechanisms for verifying expected execution of the signals by the movement system 110, for example, to confirm a wheel-speed sensor is affected by application of the brake or throttle or that the specified speed along the path is achieved by the applied throttle signal. As such, the path execution module 230 translates the higher-level path instructions to specific signals that control the physical components of the movement system 110.

The communications module 240 coordinates messaging with other systems and devices. As one example, the communications module 240 may be used for updating the mapping data 260 based on data kept by an external data source. As another example, the communications module 240 may provide diagnostic, operations, and safety information for monitoring of the autonomous vehicle 100. As such, the communication module 240 may use respective communication components (e.g., transceivers) for various communication modalities such as cellular or wireless communications.

The control system 130 may include additional modules or components for control and management of the autonomous vehicle 100 that are not explicitly shown here. For example, the control system 130 may include voice recognition and control components for interpreting commands by a passenger, a module for coordinating communication of the passenger with a remote technician via the communications module 240, and modules for operating various other features or components of the vehicle.

Phantom Objects

Figure 3:
FIG. 3 shows an example image in which a phantom object may be detected and removed, according to one embodiment.

FIG. 3 shows an example image 300 in which a phantom object 310 may be detected and removed. As shown in this example, the image 300 includes a car having a window that is reflective from the camera's perspective, such that rather than the camera showing the surface of the car glass itself, the camera captures the image of a girl reflected on the surface of the car. The example image 300 is a two-dimensional image from a camera and is used to show situations what may yield phantom objects in detected objects with ranging sensor data. Ranging sensors typically capture data as a point cloud or other representation that indicates respective distances at different angles/directions/heights from the ranging sensor based on a returned signal from the environment. As such, while the image 300 in FIG. 3 (and similar representations of ranging sensor data in FIGS. 4-5) is two-dimensional for convenience of illustration, in practice the ranging sensor data provides such distance information.

When the environment of image 300 is captured by a ranging sensor (e.g., LIDAR or RADAR), the emitted signal and its return may be distorted by the surface on the glass. Specifically, the emitted signal may be reflected by the surface, travel to another object in the environment (here a girl), return from that object, and reflect from the surface again before returning to the sensor. As such, the measured distances from surfaces of most of the car may differ from the measured distances of the glass surface, such that object recognition may identify the reflected distance data in the ranging sensor data as a different object. Though initially detected by the object recognition algorithm, the girl is a phantom object 310 on the surface of the car and does not exist in the actual environment at the perceived location.

Figure 4:
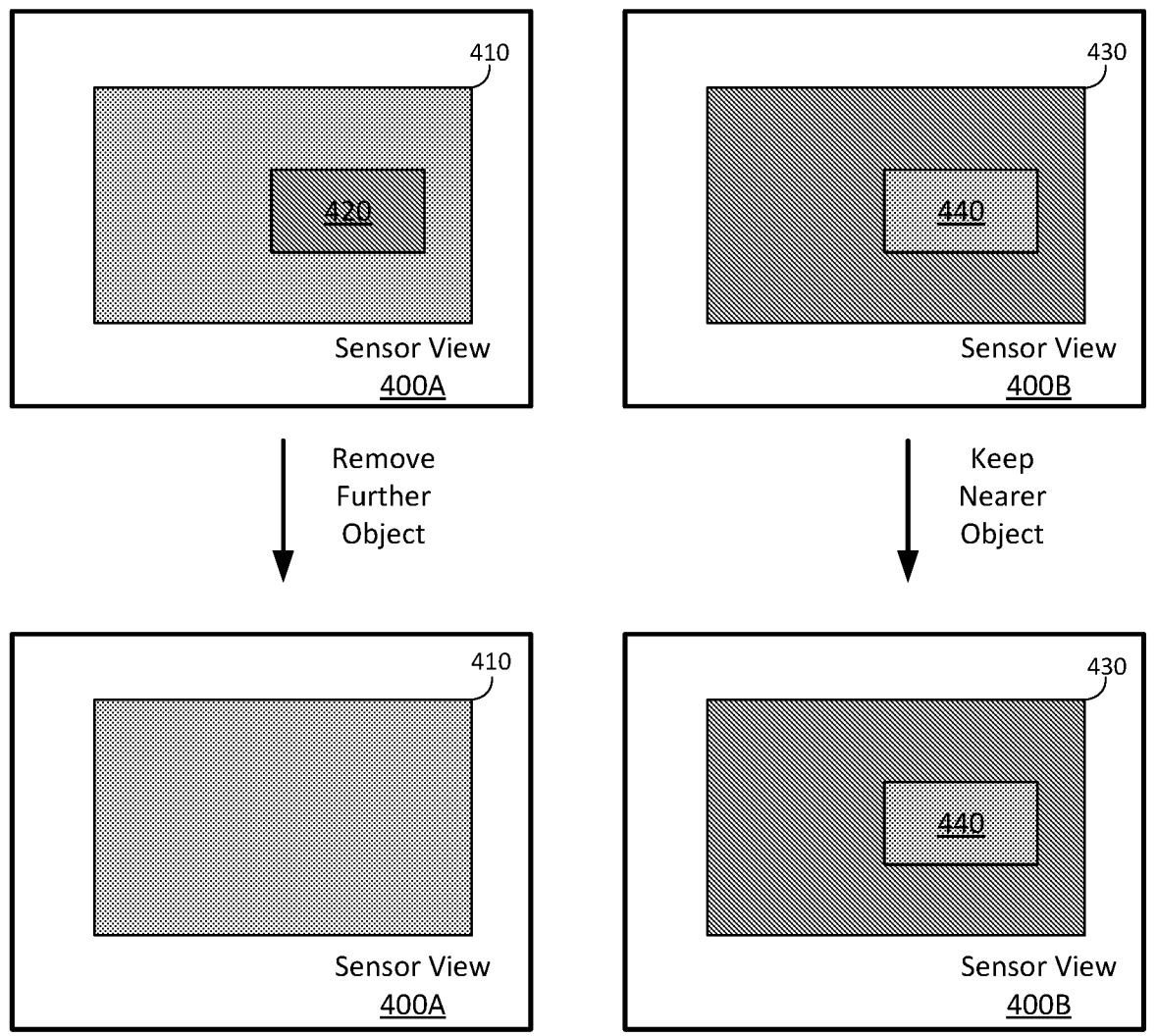
FIG. 4 shows an example for evaluating phantom objects in a sensor view captured by a ranging sensor, according to one embodiment.

FIG. 4 shows an example for evaluating phantom objects in sensor views 400A, B captured by a ranging sensor. The sensor views 400A, B represent the captured ranging sensor data from the ranging sensor, that is, the perception of the environment as seen by the ranging sensor. As discussed with respect to FIG. 3, surfaces of an object may reflect the signal and cause the received ranging data for that surface to appear further away (e.g., the perceived distance of the surface is higher than its actual distance from the sensor). To identify and remove phantom objects, the relative perceived distance for an enclosed object and an enclosing object are compared to determine if the enclosed object (e.g., the object that appears "within" another object) is at a further perceived distance than the object enclosing it. In sensor view 400A, an object perception algorithm identifies object 410 and object 420. In sensor view 400B, object 430 and object 440 are similarly identified.

In these examples, object 420 and object 440 are both enclosed by another object, specifically objects 410 and 430 respectively. To determine whether an object is enclosed, the respective positions (which may be described as a bounding box) of each object in the ranging sensor data are compared to determine whether another object has a position that encloses the object (e.g., the borders of another object) it. An object may be considered a phantom object when it is enclosed by another object and when it is a further distance from the sensor than the object that encloses it.

While the ranging sensor data may characterize the captured data in three dimensions (e.g., as a direction (rotation and elevation) and a distance from the sensor or a resulting data point cloud), the position of the objects for determining whether an object is "enclosed" may be determined based on the rotational position of the objects from the perspective of the sensor. As such, each object may have a bounding box that describes the location of the object in the sensor view. In some embodiments, an object is considered an enclosed object when at least a threshold portion of its bounding box is within another object's bounding box. The threshold may vary in other embodiments, and may include at least 50%, 60%, 70%, 80%, or more of an object's bounding box, and in some embodiments the object is considered enclosed only when its position is entirely within another object's position.

In the example of FIG. 4, as objects 420 and 440 are both enclosed, they may be evaluated for identification as phantom objects. The distance to the sensor for the enclosed objects 420, 440 and the enclosing objects 410, 430 are evaluated to determine whether the enclosed objects are further from the sensor than the enclosing objects. In sensor view 400A, the object 420 is further from the sensor (e.g., has a higher distance value based on the sensor measurement) compared to object 410 and may thus be removed as a phantom object. In sensor view 400B, the object 440 is closer to the sensor (e.g., has a lower distance value) than object 430 and may be kept as an object in the environment.

Figure 5A:
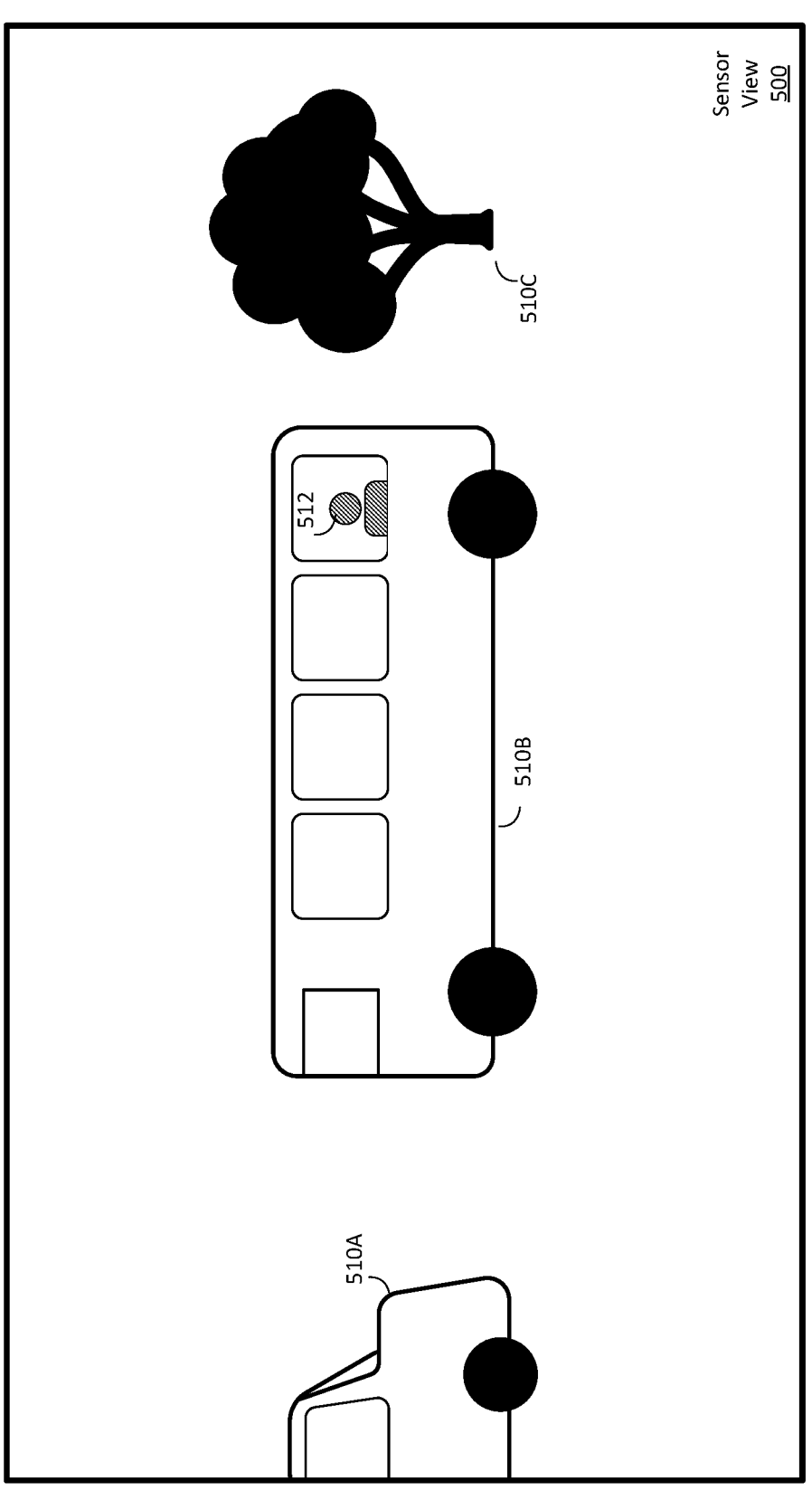
FIGS. 5A-D show an example identification and removal of a phantom object detected in a sensor view, according to one embodiment The figures depict various embodiments of the present invention for purposes of illustration only. One skilled in the art will readily recognize from the following discussion that alternative embodiments of the structures and methods illustrated herein may be employed without departing from the principles of the invention described herein.

FIGS. 5A-D show an example identification and removal of a phantom object detected in a sensor view, according to one embodiment. FIG. 5A shows an example sensor view 500 of an environment including several objects 510A-D, including a car 510A, a bus 510B, and a tree 510C. In addition, the environment includes a reflection of a person 512 that may be perceived in the sensor view as having a further distance value than the bus 510B. The sensor view 500 may then be processed by an object recognition algorithm (e.g., a trained computer model) to segment the sensor view 500 to identify objects and respective positions of the objects (e.g., bounding boxes) within the sensor view 500.

Figure 5B:
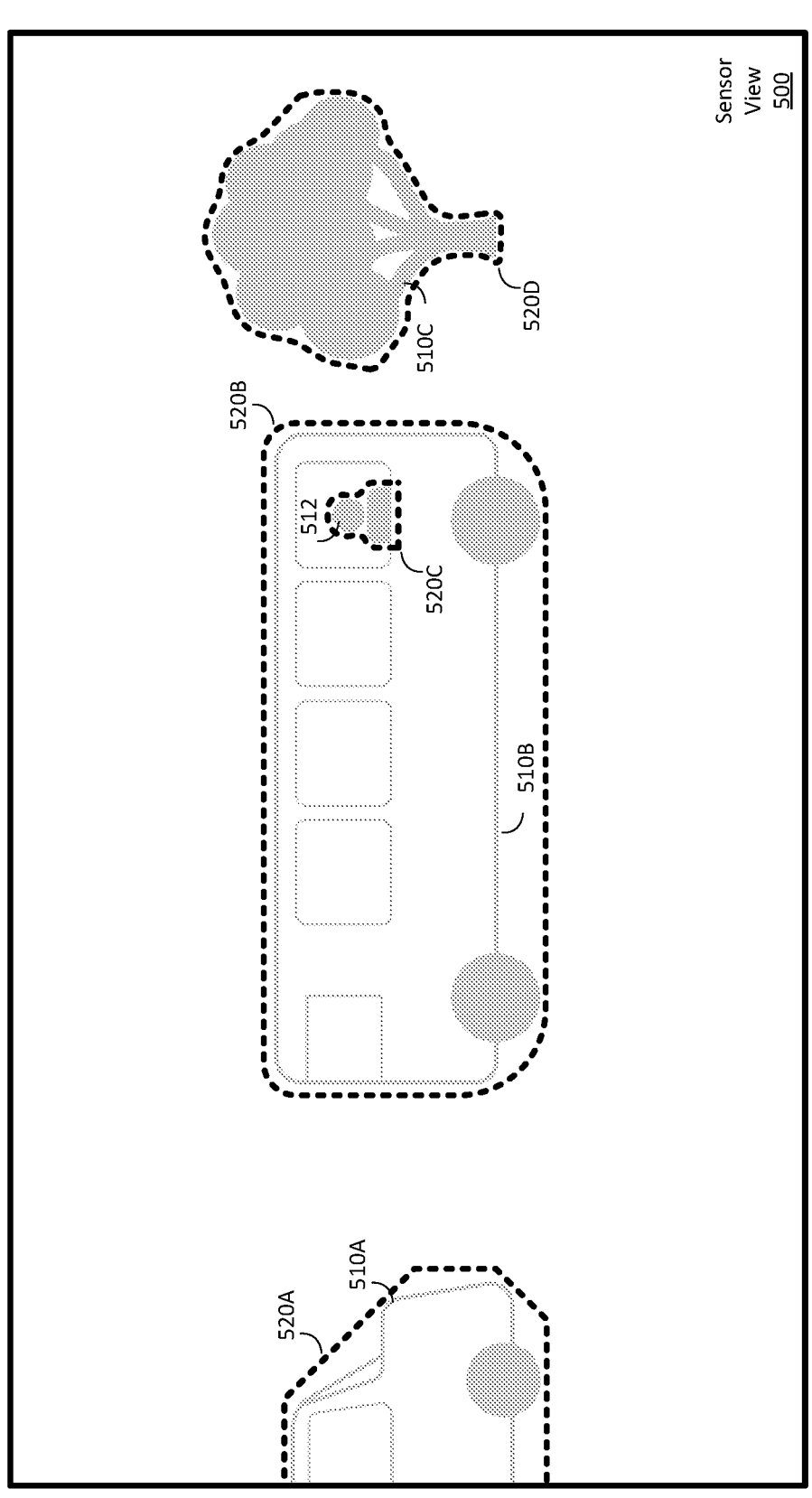

FIG. 5B shows the detected objects 520A-D as output from the object detection algorithm. As shown in FIG. 5B, the detection algorithm outputs a detected object 520A of a car, a detected object 520B for a bus, a detected object 520C of a person 512, and a detected object 520D for a tree. Each of the detected objects 520A-D may also have a detected type (e.g., car, bus, person, tree), and have respective positions in the sensor view 500 that designate the region of the sensor view 500 in which the objects were detected. Here, the detected locations are indicated by dotted lines showing bounding boxes for each detected object 520A-D.

Figure 5C:
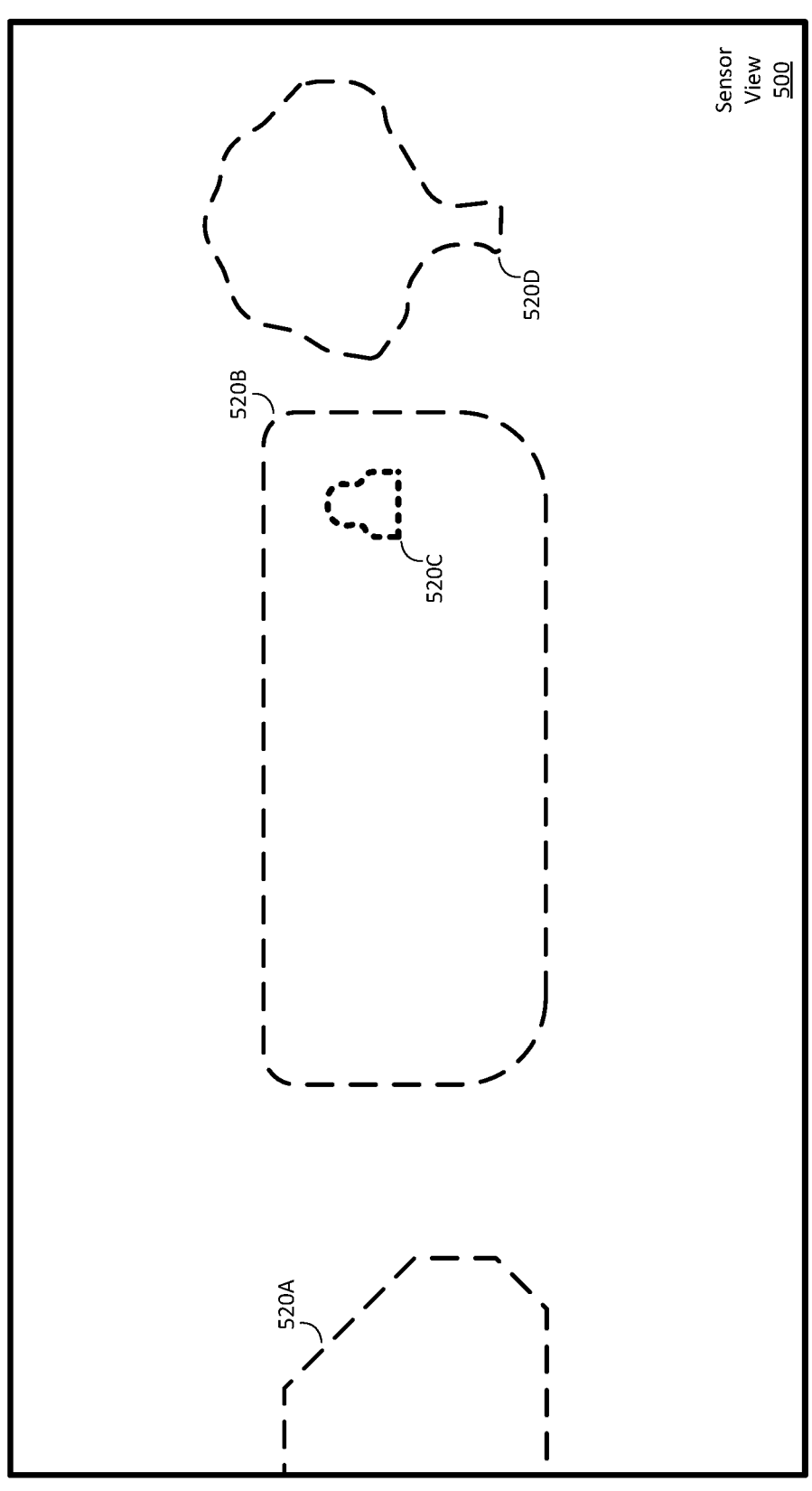

FIG. 5C shows the detected objects and their respective positions within the sensor view 500. The detected objects may be considered candidate objects for further perception processing, as these detected objects may include phantom objects identified by the object detection algorithm in the sensor view 500 but that do not exist in the environment. To identify phantom objects, the candidate objects may be evaluated to determine whether any candidate objects are enclosed by another candidate object. Candidate objects may also be evaluated with respect to one another to determine relative distance as detected by the sensor. When an object is enclosed by another object and the enclosed object has a further distance to the sensor relative to the enclosing object, the object may be considered a phantom object. In the example of FIG. 5C, detected object 520C is enclosed by detected object 520B. When comparing the sensed distance, the object 520C also has a higher distance relative to the object 520B. In this circumstance, the object 520C may be identified as a phantom object and removed from the set of candidate objects for further perception.

Figure 5D:
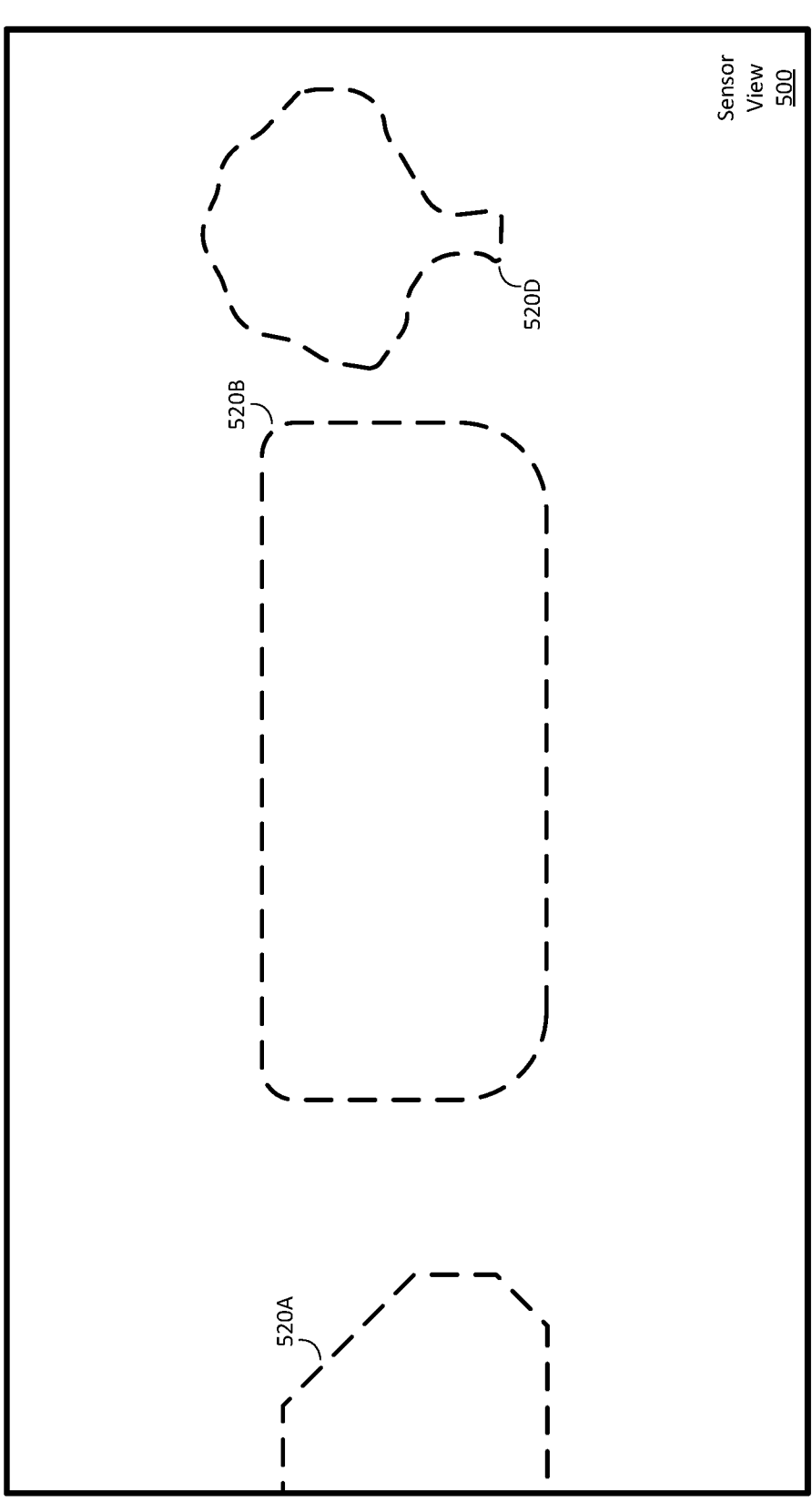

FIG. 5D shows the remaining objects 520A, B, D after removal of object 520C as a phantom object. As discussed further with respect to FIG. 6, additional factors may also be considered in determining whether to remove an object from the set of candidate objects. By removing the object 520C as a likely phantom object, the objects provided from the ranging sensor data for further perception or action tasks may thus avoid errors that may arise from improperly perceived objects—particularly those based on surface effects of an object. In addition, accounting for these perception errors after detection may be more effective than attempting to directly account for such "false positives" in the perception model itself; modifying the model directly to reduce phantom object detection may be difficult to effectively achieve without undesirable loss of model quality, gain in complexity, or introducing other types of errors in object prediction.

Figure 6:
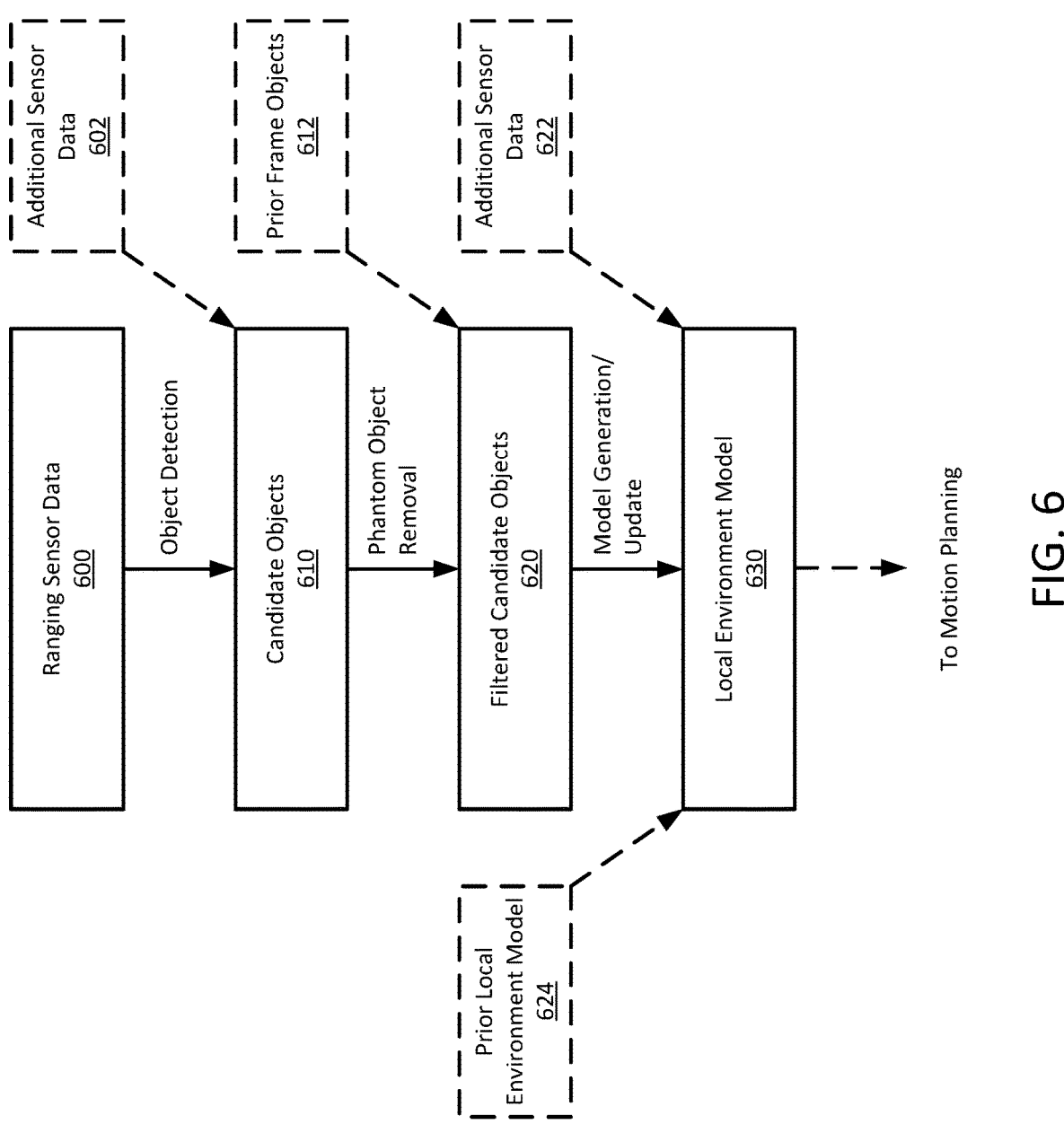
FIG. 6 shows an example data flow accounting for phantom objects detected in ranging sensor data, according to one embodiment."

FIG. 6 shows an example data flow accounting for phantom objects detected in ranging sensor data, according to one embodiment. The process of FIG. 6 (and the related discussion of FIGS. 3-5D) may be performed by the mapping and localization module 200 in processing received sensor data to generate the local environment model 250. As discussed above, ranging sensor data 600 is captured from a ranging sensor, such as a LIDAR or RADAR sensor, which may be affected by surfaces that distort perceived distances to objects. An object perception algorithm/model may be applied to the ranging sensor data 600 to identify a set of candidate objects 610. After identifying the candidate objects 610, the phantom objects may be identified and removed to determine a set of filtered candidate objects 620 (i.e., filtered to remove candidate objects), and the filtered candidate objects 620 may then be used to generate/update the local environment model 630. Each of these aspects is briefly discussed in more detail.

The object detection for generating the set of candidate objects 610 may be applied to the ranging sensor data 600 alone or may also include components that receive and incorporate additional sensor data 602. For example, in one embodiment the object detection is performed by a deep neural network that includes layers that process the ranging sensor data 600 and additional layers that perform sensor fusion of the processed ranging sensor data 600 along with additional sensor data 602 from an imaging sensor (e.g., camera) and optionally additional sensor types to detect and classify objects. These detected objects then form the set of candidate objects for the phantom object analysis and filtering. In additional embodiments, the candidate objects 610 may be processed with an object detection model applied only to the ranging sensor data 600, such that additional sensor data 602, if any, may be incorporated into environment perception after phantom objects are removed from the ranging sensor data 600.

The phantom objects are identified in the candidate objects 610 and removed from the set of candidate objects 610 to generate the set of filtered candidate objects 620 representing objects in the ranging sensor data 600 after removal of phantom objects. As discussed above, phantom objects may be identified as objects enclosed by another object and that are further from the sensor than the enclosing object.

In additional embodiments, objects may be identified or excluded from identification as phantom objects based on additional conditions. As one example, the type of the enclosed object or the type of the enclosing object may be used further determine whether the enclosed object is considered a phantom object. In one example, when the enclosed object is the type of object that may often appear in a reflection in the environment, such as a person, animal, car, or bike, the enclosed object may be permitted to be considered a phantom object, or otherwise excluded. In another example, the type of the enclosing object may be used to exclude or include the possibility that the enclosed object is a phantom; the enclosing object may be a class of objects that may include surfaces that may interfere with ranging sensors, such as a car, heavy vehicle (e.g., a truck, bus, etc.), a building, etc. In some examples, when the type of enclosing object includes non-moving objects, the enclosed object may be removed because the enclosed object may be expected not to meaningfully affect the local environmental model. For example, even if a person is correctly detected as in a building (e.g., "enclosed by" and more distant than), that detected person is unlikely to affect the operation of an autonomous vehicle using the detected objects in motion planning. Finally, enclosed objects may be included or excluded based on a combination of the types of objects for the enclosed and enclosing objects that reflect likely surface effects of different types of objects (e.g., objects likely to be perceived in the environment and objects likely to include surface effects). For example, a human enclosed by a car, a bicycle enclosed by a car, a human enclosed by a heavy vehicle, a car enclosed by a car, and so forth, may be combinations that permit removal as a phantom object, while other combinations of object types may be excluded as identification as a phantom object.

As another condition for phantom object identification, prior frame objects 612 (e.g., candidate objects detected in earlier frames of ranging sensor data) may also be used to identify phantom objects based on movement of the candidate objects across sensor data frames. As one example, the relative movement over time of the enclosed object and the enclosing object may be tracked over one or more frames. When the enclosing object and the enclosed object move similarly within the sensor view (e.g., directionally with respect to the sensor), it suggests that the enclosed object may be an artifact of the surface of the enclosing object and may be confirmed as a phantom object. For example, when the enclosing object and the enclosed object both appear to move the same speed and distance (e.g., 5 miles per hour or 8 meters per hour), they may be identified as a phantom object, and when the respective movements differ significantly the enclosed object may be prevented from identification as a phantom object.

Similarly, the relative movement of the enclosed object with respect to another object in the environment (e.g., a stationary object or another object different from the enclosing object) may be used to determine that the enclosed object is likely related to the movement of that other object, thus permitting or excluding the enclosed object from identification as a phantom object. For example, the when the enclosed object moves at similar relative speed as another object in the environment, it may suggest the enclosed object is a phantom object that may be caused by that other object, while when the enclosed object does not have similar movement from the sensor view, it may be more likely to reflect a genuine object in the environment that was correctly detected.

After the phantom objects are removed, the filtered candidate objects 620 may be used to generate or update a local environment model 630. The local environment model 630 may be updated based on a prior local environment model 624 in addition to any additional mapping data (e.g., mapping data 260) about the environment. In addition, the local environment model 630 may account for additional sensor data 622, for example with various computer models and joint sensor detection techniques, which may include other sensor data directly, or with intermediate processing, such as objects detected in the domain of the respective sensor data types. In addition to object detection and mapping, the local environment model 630 may include localization of the sensor (and a corresponding structure housing the sensor such as an AV), within the local environment model.

Finally, the local environment model 630 may be used for various purposes as also discussed with respect to the local environment model 250, such as for updating longer-term mapping data or motion control and planning of an autonomous vehicle. Accordingly, one benefit of removing the phantom objects is to improve the fidelity of the data on which control signals for the AV are generated and reducing the likelihood that the control signals account for objects which are perceived in the environment but are not actually there.

EXAMPLE EMBODIMENTS

Various embodiments of claimable subject matter includes the following examples.

Example 1 provides a method for detecting phantom objects in ranging sensor data, including receiving ranging sensor data captured by a ranging sensor; identifying a set of candidate objects in the ranging sensor data, each candidate object having respective positions in the ranging sensor data; identifying an enclosed object in the set of candidate objects having a position at least partially enclosed by a position of an enclosing object in the set of candidate objects; determining that the enclosed object has a further distance from the ranging sensor than the enclosing object; removing or maintaining the enclosed from the set of candidate objects in the ranging sensor data based as least in part in part on the determination that the enclosed object has the further distance than the second object.

Example 2 provides for the method of example 1, wherein the enclosed object is removed or maintained further based on the type of the enclosing object.

Example 3 provides for the method of examples 1-2, wherein the position of the enclosed object is a bounding box that is enclosed by a bounding box of the enclosing object.

Example 4 provides for the method of any of examples 1-3, wherein the ranging sensor is a LIDAR sensor.

Example 5 provides for the method of any of examples 1-4, further including determining relative movement of the enclosed object and the enclosing object with respect to one another across frames of the sensor data; and wherein removing or maintaining of the enclosed object is further based on the relative movement.

Example 6 provides for the method of any of examples 1-5, further including

Example 7 provides a system for identifying another object in the set of candidate objects different than the enclosing or enclosed objects; determining a relative movement of the enclosed object and the other object with respect to one another across frames of the sensor data; and wherein removing or maintaining the enclosed object is further based on the relative movement.

Example 8 provides for the system of example 7, including receiving ranging sensor data captured by a ranging sensor; identifying a set of candidate objects in the ranging sensor data, each candidate object having respective positions in the ranging sensor data; identifying an enclosed object in the set of candidate objects having a position at least partially enclosed by a position of an enclosing object in the set of candidate objects; determining that the enclosed object has a further distance from the ranging sensor than the enclosing object; and removing or maintaining the enclosed from the set of candidate objects in the ranging sensor data based as least in part in part on the determination that the enclosed object has the further distance than the second object.

Example 9 provides for the system of examples 7-8, wherein the enclosed object is removed or maintained further based on the type of the enclosing object.

Example 10 provide for the system of any of examples 7-9, wherein the ranging sensor is a LIDAR sensor.

Example 11 provides for the system of any of examples 7-10, wherein the instructions are further executable by the processor for determining relative movement of the enclosed object and the enclosing object with respect to one another across frames of the sensor data; and wherein removing or maintaining of the enclosed object is further based on the relative movement.

Example 12 provides for the system of any of examples 7-11, wherein the instructions are further executable by the processor for identifying another object in the set of candidate objects different than the enclosing or enclosed objects; determining a relative movement of the enclosed object and the other object with respect to one another across frames of the sensor data; and wherein removing or maintaining the enclosed object is further based on the relative movement.

Example 13 provides a non-transitory computer-readable medium containing instructions executable by one or more processors for receiving ranging sensor data captured by a ranging sensor; identifying a set of candidate objects in the ranging sensor data, each candidate object having respective positions in the ranging sensor data; identifying an enclosed object in the set of candidate objects having a position at least partially enclosed by a position of an enclosing object in the set of candidate objects; determining that the enclosed object has a further distance from the ranging sensor than the enclosing object; and removing or maintaining the enclosed from the set of candidate objects in the ranging sensor data based as least in part in part on the determination that the enclosed object has the further distance than the second object.

Example 14 provides for the computer-readable medium for example 13, wherein the enclosed object is removed or maintained further based on the type of the enclosing object.

Example 15 provides for the computer-readable medium for examples 13-14, wherein the position of the enclosed object is a bounding box that is enclosed by a bounding box of the enclosing object.

Example 16 provides for the computer-readable medium of any of examples 13-15, wherein the ranging sensor is a LIDAR sensor.

Example 17 provides for the computer-readable medium of any of examples 13-16, wherein the instructions are further executable for determining relative movement of the enclosed object and the enclosing object with respect to one another across frames of the sensor data; and wherein removing or maintaining of the enclosed object is further based on the relative movement.

Example 18 provides for the computer-readable medium of any of examples 13-17, wherein the instructions are further executable for identifying another object in the set of candidate objects different than the enclosing or enclosed objects; determining a relative movement of the enclosed object and the other object with respect to one another across frames of the sensor data; and wherein removing or maintaining the enclosed object is further based on the relative movement.

OTHER IMPLEMENTATION NOTES, VARIATIONS, AND APPLICATIONS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Specifications, dimensions, and relationships outlined herein (e.g., the number of processors, logic operations, etc.) have been offered for purposes of example and teaching only. Such information may be varied considerably without departing from the spirit of the present disclosure or the scope of the appended claims. In the foregoing description, various non-limiting example embodiments have been described with reference to particular arrangements of components. Various modifications and changes may be made to such embodiments without departing from the scope of the appended claims. This description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the figures may be combined in various possible configurations, all of which are clearly within the broad scope of this disclosure.

Note that in this specification, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like, are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for detecting phantom objects in ranging sensor data, comprising:
   receiving ranging sensor data captured by a ranging sensor;
   identifying a set of candidate objects in the ranging sensor data, each candidate object having respective positions in the ranging sensor data;
   identifying an enclosed object in the set of candidate objects having a position at least partially enclosed by a position of an enclosing object in the set of candidate objects;
   determining that the enclosed object has a further distance from the ranging sensor than the enclosing object;
   removing or maintaining the enclosed object from the set of candidate objects in the ranging sensor data based as least in part in part on the determination that the enclosed object has the further distance than the enclosing object; and
   determining relative movement of the enclosed object and the enclosing object with respect to one another across frames of the sensor data; and
   wherein removing or maintaining of the enclosed object is further based on the relative movement.

2. The method of claim 1, wherein the enclosed object is removed or maintained further based on the type of the enclosing object.

3. The method of claim 1, wherein the position of the enclosed object is a bounding box that is enclosed by a bounding box of the enclosing object.

4. The method of claim 1, wherein the ranging sensor is a LIDAR sensor.

5. The method of claim 1, further comprising:
   identifying another object in the set of candidate objects different than the enclosing or enclosed objects;
   determining a relative movement of the enclosed object and the other object with respect to one another across frames of the sensor data; and
   wherein removing or maintaining the enclosed object is further based on the relative movement.

6. A system, comprising:
   a processor; and
   a non-transitory computer-readable storage medium containing instructions for execution by the processor for:
   receiving ranging sensor data captured by a ranging sensor;
   identifying a set of candidate objects in the ranging sensor data, each candidate object having respective positions in the ranging sensor data;
   identifying an enclosed object in the set of candidate objects having a position at least partially enclosed by a position of an enclosing object in the set of candidate objects;
   determining that the enclosed object has a further distance from the ranging sensor than the enclosing object;
   removing or maintaining the enclosed object from the set of candidate objects in the ranging sensor data based as least in part in part on the determination that the enclosed object has the further distance than the enclosing object; and
   determining relative movement of the enclosed object and the enclosing object with respect to one another across frames of the sensor data; and
   wherein removing or maintaining of the enclosed object is further based on the relative movement.

7. The system of claim 6, wherein the enclosed object is removed or maintained further based on the type of the enclosing object.

8. The system of claim 6, wherein the position of the enclosed object is a bounding box that is enclosed by a bounding box of the enclosing object.

9. The system of claim 6, wherein the ranging sensor is a LIDAR sensor.

10. The system of claim 6, wherein the instructions are further executable by the processor for:
   identifying another object in the set of candidate objects different than the enclosing or enclosed objects;
   determining a relative movement of the enclosed object and the other object with respect to one another across frames of the sensor data; and
   wherein removing or maintaining the enclosed object is further based on the relative movement.

11. A non-transitory computer-readable medium containing instructions executable by one or more processors for:
   receiving ranging sensor data captured by a ranging sensor;
   identifying a set of candidate objects in the ranging sensor data, each candidate object having respective positions in the ranging sensor data;
   identifying an enclosed object in the set of candidate objects having a position at least partially enclosed by a position of an enclosing object in the set of candidate objects;
   determining that the enclosed object has a further distance from the ranging sensor than the enclosing object;
   removing or maintaining the enclosed object from the set of candidate objects in the ranging sensor data based as least in part in part on the determination that the enclosed object has the further distance than the enclosing object; and determining relative movement of the enclosed object and the enclosing object with respect to one another across frames of the sensor data; and wherein removing or maintaining of the enclosed object is further based on the relative movement.

12. The computer-readable medium of claim 11, wherein the enclosed object is removed or maintained further based on the type of the enclosing object.

13. The computer-readable medium of claim 11, wherein the position of the enclosed object is a bounding box that is enclosed by a bounding box of the enclosing object.

14. The computer-readable medium of claim 11, wherein the ranging sensor is a LIDAR sensor.

15. The computer-readable medium of claim 11, wherein the instructions are further executable for:

identifying another object in the set of candidate objects different than the enclosing or enclosed objects;

determining a relative movement of the enclosed object and the other object with respect to one another across frames of the sensor data; and wherein removing or maintaining the enclosed object is further based on the relative movement.

* * * * *